(12) United States Patent
Wang et al.

(10) Patent No.: US 10,219,032 B2
(45) Date of Patent: Feb. 26, 2019

(54) TUNING BEHAVIOR ENHANCEMENT

(71) Applicant: ARRIS Enterprises LLC, Suwanee, GA (US)

(72) Inventors: Yeqing Wang, Ambler, PA (US); Yaxi Zhang, Wayne, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/053,721

(22) Filed: Feb. 25, 2016

(65) Prior Publication Data
US 2017/0251242 A1    Aug. 31, 2017

(51) Int. Cl.
| | |
|---|---|
| *H04H 60/32* | (2008.01) |
| *H04N 21/438* | (2011.01) |
| *H04N 21/426* | (2011.01) |
| *H04N 21/458* | (2011.01) |
| *H04N 21/643* | (2011.01) |
| *H04N 21/81* | (2011.01) |
| *H04N 21/258* | (2011.01) |
| *H04N 21/45* | (2011.01) |

(52) U.S. Cl.
CPC ... *H04N 21/4383* (2013.01); *H04N 21/25891* (2013.01); *H04N 21/4263* (2013.01); *H04N 21/4382* (2013.01); *H04N 21/458* (2013.01); *H04N 21/4532* (2013.01); *H04N 21/64322* (2013.01); *H04N 21/812* (2013.01)

(58) Field of Classification Search
CPC combination set(s) only.
See application file for complete search history.

(56) References Cited

U.S. PATENT DOCUMENTS

| | | | | |
|---|---|---|---|---|
| 2008/0271076 A1* | 10/2008 | Schlack | ........... | G06F 21/10 725/39 |
| 2009/0013362 A1* | 1/2009 | Liu | ........... | H04N 7/17318 725/110 |
| 2009/0031392 A1* | 1/2009 | VerSteeg | ........... | H04N 7/17318 725/151 |
| 2009/0144797 A1* | 6/2009 | Wang | ........... | H04N 21/4331 725/131 |
| 2011/0078002 A1* | 3/2011 | Leary | ........... | G06Q 30/02 705/14.4 |
| 2013/0042265 A1 | 2/2013 | Copley et al. | | |
| 2014/0279047 A1* | 9/2014 | Wang | ........... | G06Q 30/0269 705/14.66 |

OTHER PUBLICATIONS

Official Action, RE: Canadian Application No. 2,958,982, dated Jan. 11, 2018.
Official Action, RE: Canadian Application No. 2,958,982, dated Jul. 31, 2018.
Official Action, RE: Mexican Application No. MX/a/2017/002308, dated Sep. 10, 2018.

* cited by examiner

*Primary Examiner* — Mulugeta Mengesha
(74) *Attorney, Agent, or Firm* — Stewart M. Wiener

(57) ABSTRACT

A client device, which can be a set-top box or a gateway device, can be operative to continue processing content (e.g., a television program) in its pipeline, while it is requesting a different content (e.g., tuning or obtaining a targeted ad). Instead of seeing a blank screen or a muted still-shot, the user in some circumstances would be able to continue to see a segment of the processed content information.

22 Claims, 3 Drawing Sheets

TUNING BEHAVIOR ENHANCEMENT

TECHNICAL FIELD

This disclosure relates to the reception and processing of video content by an end user device.

BACKGROUND

Content delivery systems, which take a variety of different architectures, provide content to users. Content, in this context, could mean any or all of video, audio, or audiovisual content, including Internet web pages, interactive computer games, or other possibilities. Typically, a communications network is used to deliver content via one or more modalities to a customer premises equipment (CPE) device. The transmission modalities can include, for example, an Ethernet cable, a satellite dish, a coaxial cable, a telephone line (including DSL connections), broadband over power line, or a terrestrial television antenna. A CPE device can be, for example, a television (TV), set-top box (STB), or gateway device (GW). A CPE device can be operable to tune, demodulate, decrypt and decode the content for delivery of the content to a user's display, such as a screen, television, or monitor, which is connected to the customer premises equipment.

As mentioned, the customer premises equipment can be used to obtain the content by, for example, tuning to a particular channel from a cable or satellite television signal for display, or in the case of IP protocol based delivery, receiving unicast and multicast IP packets. One of the characteristics associated with such device behavior is that there is a delay experienced by a user when a user initiates a command, for example using a remote control, to tune to another channel, or watch another program. Between the time a user requests a channel or program change, to the time the new program appears on the user's display, the user might see a black or still screen for a brief moment (i.e., mute to black, or mute to still), which can be milliseconds to seconds.

To minimize this delay, the present application describes a system and method whereby the decoder of a customer premises equipment continues to decode data in the pipeline so that content can be display while the new channel is being tuned to (or new content is being obtained).

BRIEF DESCRIPTION OF THE DRAWINGS

For the purpose of illustrating embodiments described below, there are shown in the drawings example constructions of the embodiments; however, the embodiments are not limited to the specific methods and instrumentalities disclosed. In the drawings.

It is noted that while the accompanying figures serve to illustrate embodiments of concepts that include the claimed invention, and explain various principles and advantages of those embodiments, the claimed invention is not limited to the concepts displayed, as additional embodiments would be readily apparent to those of ordinary skill in the art having the benefit of the description herein such that a display of certain concepts are not necessary to understand such example implementations.

DETAILED DESCRIPTION

Disclosed herein are systems and methods for processing a signal by a customer premises equipment device connected to a communications network. In particular, the concepts disclosed relate to the management of components within a customer premises equipment. As described in more detail below, the one or more components of the customer premises equipment can continue to process data, while other components have been disengaged to focus on acquiring and processing new content.

Figure 1:
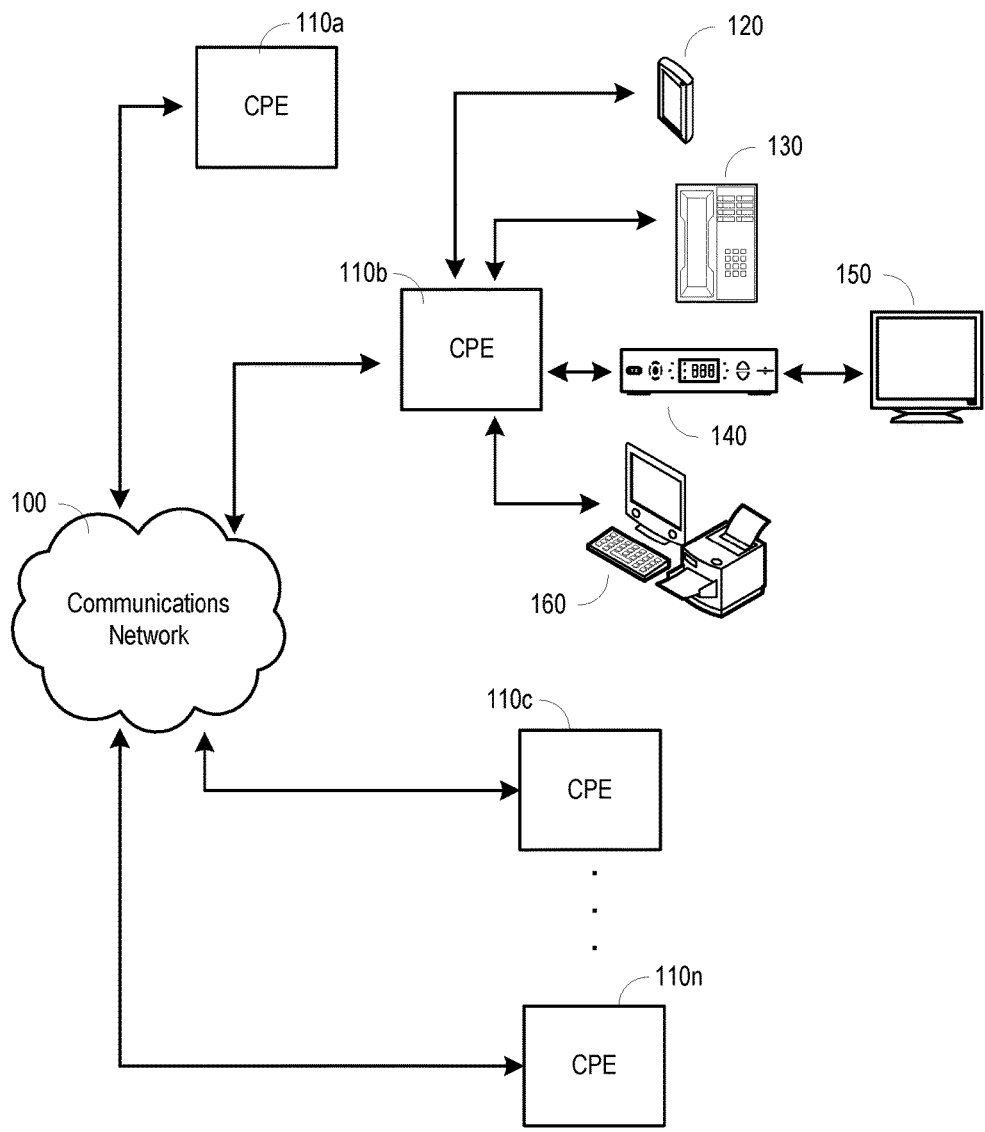
FIG. 1 depicts an example of a network environment that includes a communications network and customer premises equipment.

FIG. 1 is a diagram that illustrates one implementation of a networked content delivery environment. Referring to FIG. 1, a communications network 100 can be used to deliver content, which can be video or audio content, to a customer premises equipment (CPE) device 110 associated with a customer (aka, user, end user, consumer, subscriber). More than one CPE device 110*a-n* can be connected to the communications network 100. Additionally, although referred to as "customer premises equipment," customer premises equipment need not be fixed to a particular location, but can be a mobile device.

The communications network 100 can include an edge serving office (ESO), which may be a hub, headend or central office of a multiple service provider (MSO) such as a television, cable, satellite or telephony company. The ESO can contain various communications equipment, such as one or more modulation/demodulation devices, a content server, and other communications equipment that can provide video, data, and voice service to a user.

The communications network 100 can comprise, for example, a cable television (CATV) infrastructure implementing switched digital video (SDV), or video on demand. In some implementations, this CATV network can have as an ESO a headend having equipment such as a cable modem termination system (CMTS) that transmits and receives communications through one or more hybrid fiber coax (HFC) networks to CPE devices 110*a-n*. The headend, HFC network(s), and CPE devices 110*a-n* can be provided by multiple service operators (MSOs) that typically provide community cable television service to users. The communications network 100 can include any number of interconnected networks, head ends, SDV clusters, HFC networks, and subscriber locations. The headend, in example implementations, can be a cable television master headend facility for receiving television signals for processing and distribution over the cable television system. The headend provides the subscriber location with a variety of services and/or connections, for example, the headend may provide a connection to external services such as video servers, public switched telephone network voice, multimedia messages, and Internet data.

The communications network 100 shown in FIG. 1 can also comprise one or more networks using asynchronous transfer mode (ATM), digital subscriber line (DSL), or asymmetric digital subscriber line (ADSL) technology. These networks have typically been provided by telephone companies (a.k.a., telcos). ATM and DSL/ADSL equipment can be located at an exchange or central office, and can include integrated DSL/ATM switches, multiplexers such as digital subscriber line access multiplexers (DSLAMS), and broadband remote access servers (B-RAS), all of which can contribute to the aggregation of communications from user equipment onto a high-capacity uplink (ATM or Gigabit Ethernet backhaul) to internet service providers (ISPs). Transmission media connecting the central office and user equipment can include both twisted pair and fiber. For the user to access the DSL network, customer premises equipment 140a-n can include, for example, a DSL modem, or a set-top box.

The communications network 100 can also be comprised of a cellular communications network, wherein a number of CPE devices 110a-n, can be mobile communications devices that communicate with cellular towers. Each of the cellular towers can communicate with mobile communications devices in a cell assigned to that cellular tower. Mobile communications devices communicate with the cellular towers via wireless links. The cellular network can be of any variety, including a Global System for Mobile communications (GSM), Universal Mobile Telecommunications System (UMTS), Long Term Evolution (LTE), Code Division multiple access (CDMA) system, General Packet Radio Service (GPRS), Evolution-Data Optimized (EV-DO), Enhanced Data Rates for GSM Evolution (EDGE), 3GSM, Digital Enhanced Cordless Telecommunications (DECT), Digital AMPS (IS-136/TDMA), and Integrated Digital Enhanced Network (iDEN). Typical multiplexing schemes used by these networks can include, among others, frequency division (FDM), time division multiple access (TDM), code division multiplex (CDM), and space division multiplex (SDM), each of which can use appropriate access schemes (e.g., FDMA, TDMA, CDMA, and SDMA). Mobile devices 115a-n, 130 can include cellphones, smartphones, portable computing devices, as well as other devices capable of carrying data and voice.

The communications network 110 can also be comprised of one or more satellite networks, such as a DBS (Direct Broadcast Satellite) system, operated by DBS broadcast satellite providers (e.g., Dish Networks and DIRECTV). Such a network can transmit and process signals containing television programming. The signals can originate from a programming source (broadcaster) to one or more satellites, then back down to a DBS broadcast center, then back to the satellites, then down to a customer's satellite dish and LBN filter, to a customers' CPE devices 110a-n, which can be a satellite receiver coupled to a display.

The communications network 110 can also be comprised of an Over the Air (OTA) television network. The type of network can comprise a television station having a transmission antenna that broadcasts high definition (HD) signals containing programming content over the airwaves and can be received by a display device (i.e., an HD television) or CPE devices 110a-n in the user's home (e.g., set-top box). Alternatively, these signals can be received by an antenna mounted to a user's rooftop, wall, or nearby the display (e.g. an high definition antenna), which can be coupled to a user's CPE device 11a-n or a display device.

In addition content delivered via cable, DSL, cellular, or satellite based solutions as described above, the content can also be provided via legacy T1/T3 lines, or WiMAX networks implementing the IEEE 802.16 family of wireless networking standards, or any combination of those packet switched networks described herein or known in the industry.

In some example implementations, the communications network 115 can be, for example, a communications network capable of using packets to deliver video, voice, and data using internet protocol (IP). Thus, the network can be configured to operate as an IPTV or IP Video delivery network that transports or delivers data files and media content, including via multicast transmissions using Internet Protocol. In example implementations, the communications network 100 can include a separate IP headend. Alternatively, the IP headend and the content headend, which typically manipulates the content by encoding encrypting, and modulating the content for transmission through the network 100, can be combined at one site.

In some example implementations, a cable operator or service provider (e.g., Verizon, Comcast) may operate a communications network that allows for WAN connections to a multitude of specialized head end servers that reside in the service provider's headend or connected to the internet itself (e.g., YouTube). The service provider's headends may enable delivery of content or services over an infrastructure that is not under the administrative control of the content or service provider (i.e., Over the Top (OTT) content streaming).

The communications network 100 can include one or more components that enables the delivery of advertisements and "targeted advertisements." In the past, content delivery systems, such as a broadcast television system, have broadcasted the same television signal to each user viewing a particular station. Thus, each person viewing a particular channel will necessarily view the same program (e.g., a television show or a movie), as well as the same advertisements embedded in the programming content. Advertising efforts included an advertiser/advertisement server inserting the advertisement in the broadcast of the program. A particular advertiser purchased "commercial time slots," or an advertising spot occurring during a particular program (i.e., an advertising opportunity in a particular channel at a particular time). The slot can be selected by the advertiser based on the likelihood that members of that advertiser's target audience will be watching that particular channel at that particular time. As an example, during the daytime drama television program "Days of our Lives," a commercial time slot during this show can show an ad for a laundry detergent. That advertisement would be seen, for example, by everyone in the nation if it was a program broadcasted nationally.

As an advancement to such a system, local ad insertion systems in the content delivery system could insert ads directed, for example, to a particular region, such as a particular county or a particular city. For example, during a commercial time slot, instead of seeing the same national commercial ad during that commercial time slot, residents of Pittsburgh may see advertisements from a car dealership located in the Pittsburgh metropolitan area. During that particular time slot of a national broadcast, people from each city may see a different local ad.

Advertisers typically have a particular demographic group of individuals that they wish to reach with their advertising. The selective addressability of modern digital television service systems enables more specific targeted TV advertising.

Demographic data can be used to provide different subscribers of the same television program different advertisements that are particularly directed to them. This targeted advertising can be achieved by matching advertisements with typical characteristics of a typical group of viewers of a specific program. In a television example, cable television system operators can gather demographic information from various users over a network, and can also receive information regarding the user's viewing patterns through CPE devices (e.g., advanced set-top boxes). In other implementations, demographic information can be obtained via user account information (e.g., address information, channel subscription information, device identification information such as a machine's MAC address, etc.), which can be housed in a repository that is part of or connected to the network 100. The advertisers can then associate the information about the viewer with the programs (or type of programs) that the viewer watches. The cable operator can then select and "insert" advertisements into audio/video content streams through the network that best fit the demographics of the group of viewers. For instance, the manufacturer of a particular brand of sporting equipment might have a primary target audience of males between the ages of eighteen and fifty, living in households in lower Massachusetts, that watch the TV program "NFL Turning Point."

Thus, to effectively target advertising to subscribers, communications networks can obtain data, including viewing data, from user's customer premises equipment that can be used to understand certain attributes of the target subscriber, such as demographic and psychological attributes, or other data relevant to determining the appropriateness of an advertisement for the particular subscriber. Such data can include past viewing habits, previous purchasing selections, and the like.

As one example, in a cable television environment, a group of subscriber households can be selectively addressed through a cable node serving that group. Similarly, individual subscriber households can be selectively addressed though their set-top box terminals. One example of addressable delivery can be, for example, the delivery of packets of information having the address of a CPE to the CPE device. As another example, a CPE device can be instructed to ignore packets having information in a particular field, but download other packets having information in a particular field. In such example manners, a service provider can send different data to different subscribers or groups of subscribers.

In example implementations, one or more targeted advertising servers within a communications network 100 can be operable to insert the advertisements (or substitute/replacement ads) under the direction of an ad selection server, which can makes its determinations based on information received from an switched digital video manager and a subscriber demographics database.

The choice of which of the advertisements to present to the subscriber at any given time may be made by the set top terminal itself or by the service provider (e.g., an MSO). In example implementations, the targeted advertising servers can access a database that holds the demographic and viewing data of users (e.g., viewing history, subscriber geography, purchased products through interactive ads, responses to surveys and questionnaires, etc.) and use that information to select an advertisement and insert a replacement advertisement. The advertiser may have been preselected by a particular advertiser for a user base having particular demographics or characteristics.

Such targeted advertising servers can be loaded with a multitude of ads that can be inserted at the appropriate points in the programming. Multiple advertisements may be available for each advertising timeslot in the programming. The targeted advertising server can choose the most appropriate advertisement to be inserted into each advertising timeslot of the program stream based on a multitude of factors. As an example, the most appropriate advertisement will generally be the advertisement that is best targeted to the group of subscribers who are currently tuned to the SDV program in which the advertisement is to be inserted. Components within the communications network can keep track of the users that are tuned to each program. The targeted advertising server can select an advertisement for insertion into the program's stream based on the content of the program, and awareness of the viewers currently watching the program, their demographic information, the particular advertisements that are available in the targeted advertising server, or any combination of these factors. The advertisement that is determined to be most appropriate for the largest number of subscribers actively watching the program will hereinafter from time to time be referred to as the primary ad. The primary advertisement can be inserted directly into the program stream by the ad replacement server.

In other example implementations, ads and targeted ads can be sent via a packet network. A CPE device (e.g., CPE devices 110a-n) can insert the ads for display to the user at the appropriate time. CPE devices can also store such ads locally (e.g., in local memory or storage), and insert the ad into the program at another time (such as hours or even days later).

Thus, a communications network 100 enabled with targeted advertising systems or components (e.g., a targeted advertising selection and insertion server) can send a main or primary ad, and one or more alternative/replacement advertisements to subscribers. The alternative advertisements are advertisements that can substitute or replace any given primary ad. The alternative advertisements can be selected under the direction of the communications network 100, or in other examples, by a CPE device 110a-n, wherein the subscriber's CPE device 110a-n can have a repository (e.g., memory or hard drive, such as storage device 260) that contains multiple advertisements from which to choose.

The communications equipment of the network 100 can communicate with one or more CPE devices 110a-n through one or more types of transport networks. Examples of a transport network can include one or more hybrid-fiber coaxial (HFC) networks and/or RF over Glass (RFoG) networks. An example HFC network can use a combination of optical fibers and coaxial cable to send data to and receive data from the communications equipment at the edge serving office 105. One or more RFoG networks can be deployed with existing HFC networks. RFoG networks typically include an all-fiber service from the edge serving office 105 to a field node, or optical network unit (ONU), which is typically located at or near the user's premises. Coaxial cable can be used to connect the ONUs of an RFoG network to one or more user devices 120a-n. Additionally, any other wired or wireless networks, or combination thereof, may be used, including Passive Optical Networks (PON), Gigabit Passive Optical Networks (GPON), Digital Subscriber Line (DSL), Wi-MAX, or copper twisted-pair. In implementations in which the communications network 100 comprises a satellite or cellular network, the medium can be air.

Having described the network and transport network, examples of CPE devices (e.g., CPE devices 110a-n), will now be described. One or more CPE devices can reside at a user's premises (e.g., a home or an office), and more than one CPE device can be coupled to the communications network 100 (including more than one device in a particular user's premises). In FIG. 1, only four CPE devices 110a-n are shown for illustrative purposes, but more or less may be deployed and served by one or more communications networks, or sub-networks. CPE devices can be, for example, cable modems, EMTAs (also known as cable telephony modems), DSL modems, satellite receivers, televisions, residential gateways, set-top boxes, and even mobile devices. A CPE device 110 may be operable to process communications sent to and received from communications equipment of the communications network 100.

FIG. 1 also depicts a CPE device (labeled as 110b) that can be a "gateway device" (also referred to as a media server, set top gateway, or media streamer). A gateway device is often referred to as a residential gateway or home gateway, although gateway devices can reside at a user's premises that is a place of business, commerce, or public gathering. A gateway device connects a premise's localized network (for example, a home network) to a communications network (e.g., communications network 100) outside of the premise. Most home network gateway devices 120 provide broadband connectivity and Internet connection sharing for various home devices (e.g., set-top boxes, computers, mobile devices, VoIP phones), thus providing for a centralized signal entrance point to a customer's premises.

The gateway device can be a multi-tuner device that serves as a hub for all media content that enters the premise from the communications network. The gateway device may deliver content to client devices over a variety of media, including co-axial cable, Ethernet, or a wireless network (e.g., a Wi-Fi network). The client devices connected to the gateway can communicate and exchange data with and through the gateway. The client devices connected to example gateway device 110b shown in FIG. 1 include a mobile computing device 120 (e.g., a tablet, laptop, netbook, ultrabook, or smartphone) that may enter and leave the premises wireless network, a phone 130 (e.g., a POTS phone, base station, or a VOIP phone), a video player 140 (e.g., a media player or a set-top box, which can be connected to a display device 150, such as a monitor or television), a personal computer 160, gaming systems (not shown), or the like.

Figure 2:
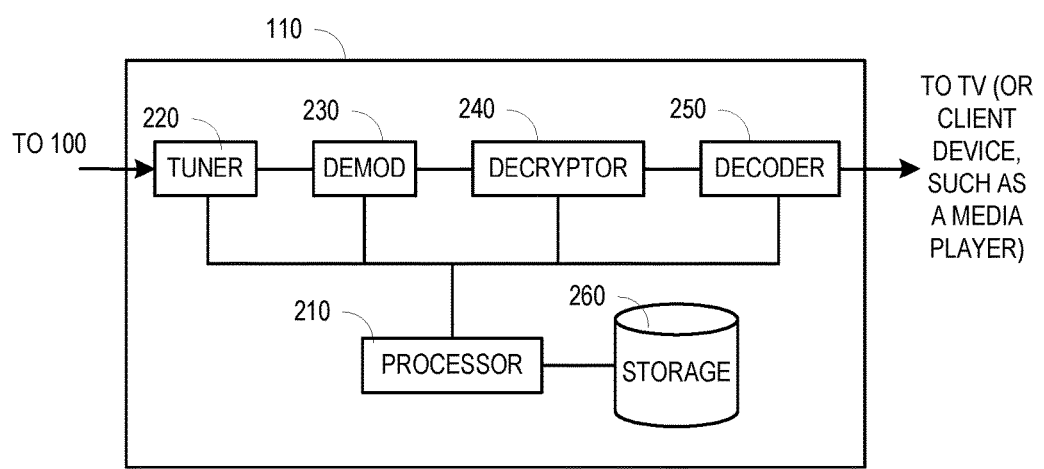
FIG. 2 depicts an example of a CPE device.

FIG. 2 shows an example of some of the components that can be found in a device that is a set-top box.

Traditionally, a set-top box derived its name from the fact that it was a box that sat on top of a television set. Even though the name set-top box prevails, a set-top box can be placed in a variety of different locations. In conventional applications, the primary function of a set-top box is to receive a signal from a communications network, process it, and output the signal's contents for display.

For the purposes of this application, only the processing of downstream (i.e., from the network) signals shall be elaborated upon. Set top boxes can process the content and forwards the processed content to a display (e.g., television, monitor, screen, etc.) for consumption by the user.

In some instances, the set-top box itself can serve as an access point for the user to an interactive network that makes available Internet content, video-on-demand, pay-per-view and other services. By way of example and not limitation, advanced functionality in a set-top box may include the ability to access and playback MPEG-1 Audio Layer 3 (MP3) files and play lists, recorded video or photo slide shows; interact over a video phone; view a front door security camera; play a computer game; browse attached network storage; access a web browser or access an e-mail application.

In some implementations, for example implementations in which the communications network 100 uses Internet Protocol (i.e., an IPTV or ITV network), the CPE device 110 can be an IP set-top box (or gateway device) that can receive and process content contained in multicast or unicast packets. The set-top box can have modulator/demodulators and routers and switches that can processes multimedia streams and a send multicast join requests. The set-top box can be operable to respond to a channel change request, request multicast joins, receive multimedia streams and content, record content, and/or send the content to a display device for display.

Still referring to FIG. 2, in some example implementations, a set-top boxes can also allow other set-top boxes to connect with it, and store recorded content on it. For example, one set-top box having a DVR (i.e., digital video recorder, typically a storage device such as a hard drive or some other memory device) could be connected to a display, but it could also be connected other set-top boxes without DVRs. When a user wishes to record a program, the content would be stored on have its content stored on the DVR of that set-top box.

Still referring to FIG. 2, in other example implementations, the CPE device show in FIG. 2 can be a gateway device (e.g., for example, as illustrated as CPE 110b of FIG. 1) that can implement the method of FIG. 3 below. The gateway device can perform switching and routing and, in the case of the downstream signal from the communications network 100, demodulation, decrypting, and decoding functions.

As mentioned above, the gateway device can also be connected to one or more client devices, such as a media player or set-top box. Thus, the gateway may have one or more components (either as part of the decoder/encoder) that can send the contents received from the communications network and send it to the client devices in any number of formats. The gateway device can also be operable to receive requests for content from a media player device, wherein the media player device can be responsive to a user's remote control (further described below).

Also, it should be noted that in other example implementations, the contents of set top box could be integrated into a display (e.g., a television).

Architecturally, among other components, the CPE device 110a-n can include a processor 210, which can be coupled to a tuner 220 (or multiple tuners), which tunes to a particular frequency, a demodulator 230 that demodulate the signals on that frequency, a decryptor 240 that decrypts received content, and a decoder 250 that decodes the content.

The example CPE device 110a-n depicted in FIG. 2 can also include a storage device 260 that can be either a magnetic memory such as a hard drive or a semiconductor memory such as Random Access Memory (RAM), Dynamic RAM (DRAM), non-volatile computer memory, flash memory, or the like. The storage device can store user settings, control information, IP addresses, CPE identification information (e.g., MAC address), URLs, targeted ads, electronic program guide data, and content, such as movies or TV programs, received from the communications network. The memory can include operating system, administrative, and database one or more programs that support the methods and programs disclosed in this application. The storage device 260 can be connected to the processor 210 via, for example, a communications medium such as a bus (e.g., SATA, eSATA, SCSI, flash, or the like).

The processor 210 performs the disclosed methods in accordance with the present invention by executing the sequences of operational instructions that comprise each computer program resident in, or operative on, the memory 250. In example implementations, the processor 210 can execute programs or applications, which can be stored in the storage device 260. These programs and applications can enable advanced functionality such as higher level internal functions, and interconnectivity with external networks and devices. Some application programs can provide the viewer with access to basic functions, such as the display of a video content stream on the television, and advanced functions, such as an interactive program guide, video-on-demand (VOD) services, interactive television, and other next-generation television application programs.

In some example implementations, such programs and applications can include functions related to gathering user viewing patterns, and ad selection and insertion. For example, an advertisement decision manager (ADM) software module can be responsible for gathering consumer behavioral information and using that information to determine which targeted ads to deliver when an advertisement opportunity presents itself. The ADM module can gather an assortment of consumer behavior related information from the viewer. In the case that the CPE device is a gateway device, the local advertisement decision manager module can collect this assortment from each device connected to the home gateway device. Thus, the ADM can collect information on the consumer behaviors from the devices to which the gateway device is connected. The on-premises ecosystem in this manner may perform localized data collection, using the gateway device to monitor content transmitted and received via the localized network. Then, the ADM can be responsible for relaying behavioral information to a targeted advertising selection and insertion server in the communications network (e.g., communications network 100), and for storing any targeted ads sent from the communications network (e.g., storing it in storage device 260). Based on the compiled behavioral information, and depending on the advertisements that are available, the home network gateway device 120 can more efficiently select advertisements at suitable times and to suitable devices within the home network, and then insert targeted ads into the content streams delivered to those client devices to which it streams content. Patent applications numbers US 2011/0078002 and US 2014/0279047 describe examples of network and client side components and functionality related to various aspects of targeted advertising.

Each component mentioned can be comprised of one or more chips or devices, operable to perform the functions of that component, and each component could also have its own memory associated with it (e.g., buffer memory).

In example implementations, some of the components of example CPE device 110 show in FIG. 2 can be can be split amongst one or more devices, such as set-top box, a gateway device, or even a media player. For example, the storage device 260 can reside within (or be connected to) a gateway device. In other implementations, the storage device 260 can reside within a media player. In some implementations, firmware that can be used to generate a program guide may be stored in a set-top box. In other implementations, this firmware can be stored in a media player.

Functionally, in example implementations, a user viewing a display (e.g., a television set) who wishes to change the program may initiate a signal via a remote control (e.g., select a new program from the interactive program guide, or hit the channel up or channel down button) to the media player, which in turn sends a signal requesting content to the gateway via, for example IP protocol over the coaxial network of the user's home. In turn, the gateway device can then initiate a channel change (i.e., tune to another frequency) or obtain another program from the communications network 100. The gateway device can process the signal and then transmit the content in a format to be processed by the media player and displayed for viewing on the television.

The CPE device 110 may receive programming from the network that includes inserted ads (as mentioned above), or receive and store targeted ads locally in one or more storage devices, for example in storage device 260. The CPE device can be operable to determine which ads should be inserted into which slots of a playing program, and insert those ads. If the CPE device is a gateway device, the communications network can deliver multiple advertisements to the gateway device, and gateway device is responsible to determine whether to deliver advertisements to the one or more client devices connected to the gateway device, and, if delivering, which advertisement to provide to the at least one of the plurality of client devices.

Currently, in set-top boxes and gateways, there is a delay that occurs between the moment a user selects a new channel (or requests another program, for example, by transmitting an IP "get" or "multicast join") and the moment in which the content begins to appear on a user's display. Depending on a variety of factors, this delay in the time it takes to acquire and display new content can be in the order of a few millisecond to several seconds.

In one content delivery example architecture, there is a time delay for the switched video manager to tune from a current SDV service to a requested SDV service when the requested SDV service is not currently being delivered to the set-top box that is requesting the service. The switched video manager will not be able to direct an edge resource manager device (located at, e.g., and edge serving office) to deliver the requested SDV service at the exact time that corresponds to a seamless transition between the current SDV service and the requested SDV service. Since the response time for the edge resource manager device, Internet Group Management Protocol (IGMP) join time, and the time to convert IP to MPEG are not constant, the time delay may vary on the order of hundreds of milliseconds depending on the loading of the various systems. Furthermore, the time required for message communication between the SDV client in the set-top box and switched video manager, and message communication between the switched video manager and the switching equipment may add to this delay.

From a functional standpoint, in some existing systems, when a channel change is requested and executed, the entire audio-visual data path is taken down at the same time. Referring to FIG. 2, this means that the tuner, demodulator, decryptor, and decoder are all taken down at the same time. Any possible video or audio data still in the pipeline (for example, still in the buffer of the decoder) that did not reach the display yet is discarded.

In some existing systems, when a targeted ad is being displayed, the set-top box will not take down the entire session until after any data in the pipeline has been presented to the user. Further, in these systems, the tuner cannot be moved until after all the data has been presented (i.e., any buffers having audio-video are cleared). This can result in even more delay because the tuner in the front end is waiting for the back end data processing to be completed. As another issue, unexpected data might continue to flow into the pipeline and be decoded and displayed. After all the data has in the processing pipeline has been presented and the session has been taken down, the tuner moves to obtain more programming, which also results in a delay.

During this delay, as experienced by the user, the display (e.g., television) appears to the user as a black screen with no sound (i.e., mute to black), or a still shot of the last frame of the program (i.e., mute to still).

Figure 3:
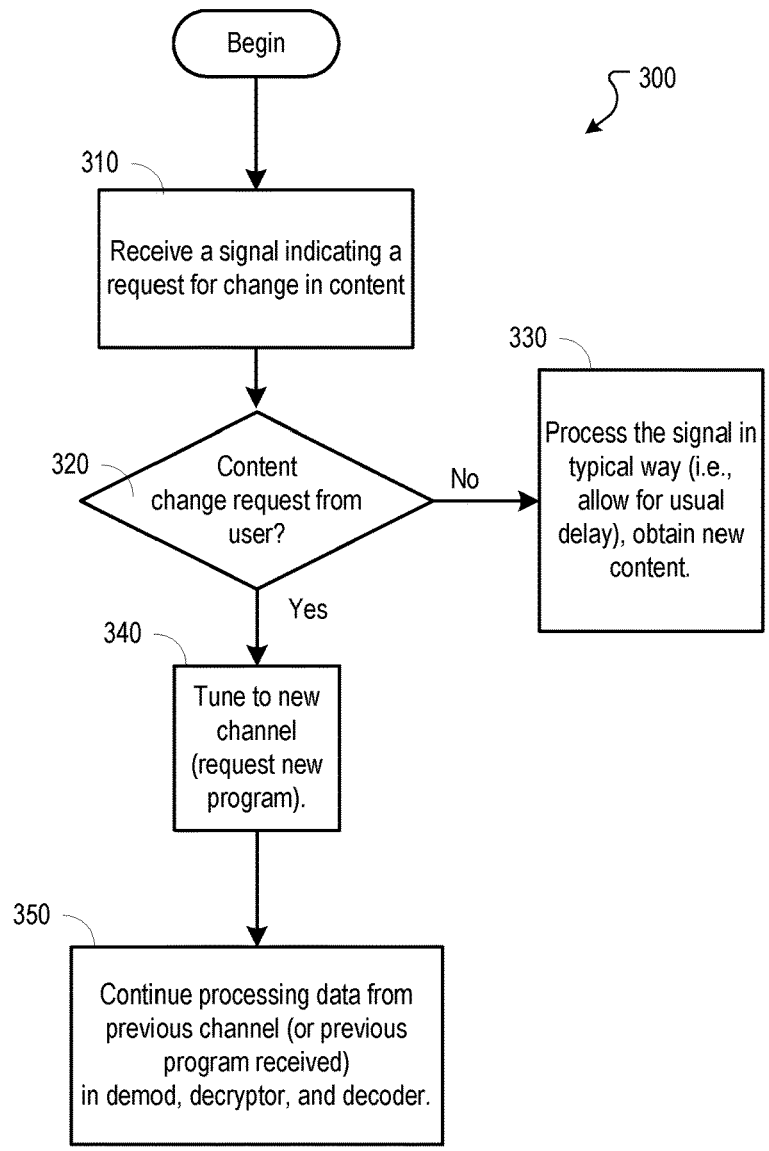
FIG. 3 depicts an example of a method that the CPE device can be operative to perform.

FIG. 3 describes an example implementation of a method that can be performed in accordance with the present invention. The method can be performed by a CPE device (e.g., CPE device 110a-n), which can be, for example, a set-top box or gateway device and more specifically, one or more processor that control the operation of the CPE device (e.g., processor 210). In this method, the user would continue to see some programming or advertising (milliseconds to seconds), even though a tune to targeted ad (or obtain targeted ad) request has been initiated by the device. While the viewer is viewing the last moments of the program before commercial, the tuning process (or retrieval process) has already begun, and by the time the commercial time slot begins, the first moments of the targeted ad is already in the pipeline and ready to be displayed. The significantly minimizes the transition time between the program the user is viewing and the commercial (ad). As mentioned above, a software module, e.g., an advertisement decision manager (ADM) software module, can determine which ad to obtain (tune to, or retrieve locally) and insert it into a displayed program's commercial advertising time slot. Of note, if the tune command (i.e., a channel change request) has been initiated by the user (not the device), the CPE device 110a-n can perform as described in (in reference to FIG. 2) above, which allows for the delay. The reason for this is that when a user initiates a tune command, the user expects a reaction from the system that indicates that the user's tune command has been received. If the currently viewed program is continued to be streamed to the display, even milliseconds to a second after the user has initiated the request for a change in content, the user can get the impression that his or her content change request was not received.

The example method of FIG. 3 can begin in a state in which the CPE device is receiving signals that contain content information from a communications network (e.g., communications network 100), processing the signals for display, and displaying the content on a display that the viewer can view (e.g., a television set). Some of the processing components can include a demodulator (e.g., demodulator 230), decryptor (e.g., decryptor 240), and decoder (e.g., decoder 250).

At 310, a signal can be received indicating a request for change in content. The signal can be, for example, a request from the viewer, indicating that the viewer wishes to change a channel (i.e., request to discontinue viewing the current program and view a different program). The signal from the user can be received by the processor of the CPE device (e.g., processor 210) from an infrared (IR) interface in the CPE device. The IR interface can be operable to receive a signal (e.g., an infrared signal) generated from a user input device (e.g., a remote control) indicating a channel change. The IR interface in turn can process the infrared signal and send a signal to the processor.

At step 310, the signal received indicating a request for a change in content can be a non-user initiated request. An example of a non-user initiated request can be, for example, a command from the execution of one or more modules related to the retrieval of a targeted ad (e.g., an advertisement decision manager (ADM) software module responsible for gathering consumer behavioral information and using that information to determine which targeted ads to deliver when an advertisement opportunity presents itself), with the content being the targeted ad.

At block 320, if the request to view a different program was initiated by the user (e.g., a channel change request from a user's remote control), the process proceeds to block 330. At block 330, the signal can be processed in the typical way—described (in reference to FIG. 2) above. As mentioned above, this can result in some delay between the time the channel change request is made, and the time that the newly requested program is tuned to.

At block 320, if the request for a change in content is a non-user initiated request, a request to view a different program has been received (e.g., a channel change request from a user's remote control), then at 340, the set-top box can tune to the new channel (or request the new program, via, e.g., an IP "get" or multi-cast "join"). In example implementations, the tuner (e.g., tuner 220) can be directed to tune to a new channel by the CPE device's processor (e.g., processor 210).

At block 350, the CPE device can continue to process the data that is already in the pipeline (i.e., from the previous channel or previous IP unicast or multicast). Here the processor (e.g., processor 210) would withhold any signal to the set-top box components (e.g., demodulator 230, decryptor 240, decoder 250, etc.) that would be involved in generating or rendering an image on the user's display. The components would continue to process information in the pipeline until new data is received from the communications network (e.g., communications network 100), which would bring the process back to block 310 of FIG. 3. The CPE device 110a-n can be operative to begin tuning to (or obtaining) the targeted ad a split second earlier with the anticipation that the ad will be played in the time slot as soon as the time slot arises.

The method of FIG. 3 can also apply in a situation in which an ad is being displayed to the user and the CPE device 110a-n initiates a request to tune back to the program (or obtain program content)—i.e., "back from commercial." Similarly here, while the last moments of the commercial are being streamed to the user's display device, the CPE device 110a-n can already being to tune to (or obtain) the program content, so as to minimize the delay in transition time between the end of the commercial and the beginning of the next program segment.

In one or more examples, the functions described herein may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

A computer-readable storage medium may have stored thereon instructions that, when executed, cause a processor to divide the OFDM channel in to a plurality of modulation tiers across the plurality of subcarriers based on a modulation level. Instructions further cause the processor to define a metric associated with a measurable characteristic of the network elements, wherein at least one metric value for the metric is associated with each of the plurality of modulation tiers, and collect measurements for a plurality of the network elements communicating over the OFDM channel, each measurement corresponding to one of the plurality of network elements and a respective one of the plurality of subcarriers. For each of the plurality of network elements, the instructions cause the processor to translate the measurements collected for the respective network element for comparison to the metric values associated with the plurality of tiers, and allocate each of the plurality of network elements to a tier in the plurality of modulation tiers based on the comparison of the measurements collected for the plurality of network elements to the metric values associated with the plurality of modulation tiers.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec.

Also, the techniques could be fully implemented in one or more circuits or logic elements. The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

We claim:

1. A method for processing content received from a communications network, the method comprising:
in one or more processors of a Customer Premises Equipment (CPE) device communicatively coupled to a communications network:
receiving from the communications network a signal containing a program;
processing the received signal to display the program;
receiving a request to tune to other content;
determining whether the request was generated from a user input device or from a module of the CPE device; and
differentiating, based on a result of the determining, between a user-initiated command to tune to other content and a non-user initiated command to tune to other content, the differentiating comprising:
responsively to the request being generated from a user input device, stopping the processing of the signal containing the program while obtaining the other content, and during a delay after the user-initiated command to tune to other content has been received, displaying one of a mute to black and a mute to still; and
responsively to the request being generated from a module of the CPE device, during a delay after the non-user initiated command to tune to other content has been received, continuing to process the signal containing the program for display of the program while obtaining the other content, and continuing to display the program during the delay.

2. The method of claim 1, wherein the communications network comprises a network capable of providing Switched Digital Video.

3. The method of claim 2, wherein obtaining the other content comprises an advertisement.

4. The method of claim 1, wherein the communications network comprises a network capable of delivering IP packets, and wherein the signal containing the program comprises IP packets.

5. The method of claim 4, wherein obtaining the different content comprises one or more of:
transmitting an IP "get" request to the communications network; and
transmitting a multicast join request to the communications network.

6. The method of claim 1, wherein the communications network comprises one or more program modules for inserting a targeted advertisement into the signal containing the program.

7. The method of claim 1, wherein obtaining the other content comprises retrieving from local storage an advertisement for display.

8. The method of claim 7, wherein the local storage is in a gateway device.

9. A Customer Premises Equipment (CPE) device comprising:
at least one output port configured to output one or more signals containing content information leading to the display of content on a display device, a demodulator, decryptor, and decoder for processing a signal containing content information received from a communications network;
a storage device for storing advertisements; and
one or more processors communicatively coupled to the communications network, the one or more processors configured to execute computer-readable instructions for:
receiving from the communications network a signal containing a program;
processing the received signal to display the program;
receiving a request to tune to other content;

determining whether the request was generated from a user input device or from a module of the CPE device; and differentiating, based on a result of the determining, between a user-initiated command to tune to other content and a non-user initiated command to tune to other content, the differentiating comprising:

responsively to the request being generated from a user input device, stopping the processing of the signal containing the program while obtaining the other content, and during a delay after the user-initiated command to tune to other content has been received, displaying one of a mute to black and a mute to still; and responsively to the request being generated from a module of the CPE device, during a delay after the non-user initiated command to tune to other content has been received, continuing to process the signal containing the program for display of the program while obtaining the other content, and continuing to display the program during the delay.

10. The device of claim 9, wherein the communications network comprises a network capable of providing Switched Digital Video signals.

11. The device of claim 9, further comprising a tuner for tuning to another channel.

12. The device of claim 9, wherein the communications network comprises a network capable of delivering IP packets, and wherein the signal containing content information comprises IP packets containing the program.

13. The device of claim 9, wherein obtaining the other content comprises one or more of:

transmitting an IP "get" request to the communications network; and transmitting a multicast join request to the communications network.

14. The device of claim 9, wherein the communications network comprises one or more program modules for inserting a targeted advertisement into the signal containing content information.

15. The device of claim 9, wherein the CPE device comprises a set-top box.

16. The device of claim 9, wherein the CPE device comprises a gateway device that provides an entrance point to a localized network, the localized network having a plurality of client devices in the localized network linked to the gateway device.

17. The device of claim 16, wherein at least one of the plurality of client devices connected to the gateway device comprises a mobile device, and the localized network comprises a wireless network.

18. The device of claim 16, wherein at least one of the plurality of client devices connected to the gateway device comprises a media player connected to a display.

19. The device of claim 16, wherein at least one of the plurality of client devices connected to the gateway device comprises a media player connected to a display, and the localized network comprises a coaxial network.

20. The device of claim 16, wherein the CPE device controls the advertisement selection for the client devices connected to the gateway device.

21. The device of claim 16, wherein the communications network delivers multiple advertisements to the gateway device, and the gateway device is operable to determine whether to deliver advertisements to one or more of the devices connected to the gateway device, and, if delivering, which advertisement to provide to the at least one of the plurality of client devices.

22. A non-transitory computer-readable storage medium having stored thereon instructions that, when executed, cause one or more processors of a Customer Premises Equipment (CPE) device communicatively coupled to a communications network to:

receive from the communications network a signal containing a program;

process the received signal to display the program;

receiving a request to tune to other content;

determining whether the request was generated from a user input device or from a module of the CPE device; and differentiating, based on a result of the determining, between a user-initiated command to tune to other content and a non-user initiated command to tune to other content, the differentiating comprising:

responsively to the request being generated from a user input device, stopping the processing of the signal containing the program while obtaining the other content, and during a delay after the user-initiated command to tune to other content has been received, displaying one of a mute to black and a mute to still; and responsively to the request being generated from a module of the CPE device, during a delay after the non-user initiated command to tune to other content has been received, continuing to process the signal containing the program for display of the program while obtaining the other content, and continuing to display the program during the delay.

* * * * *